US 6,651,914 B1
United States Patent — Langenecker
Date of Patent: Nov. 25, 2003

(54) PHYSICAL INACTIVATION OF PARASITES

(76) Inventor: Bertwin Langenecker, 29 Woodside Dr., Moraga, CA (US) 94556

( * ) Notice: Subject to any disclaimer, the term of this patent is extended or adjusted under 35 U.S.C. 154(b) by 0 days.

(21) Appl. No.: 09/945,399

(22) Filed: Aug. 31, 2001

Related U.S. Application Data

(60) Provisional application No. 60/230,223, filed on Aug. 31, 2000.

(51) Int. Cl.$^7$ ............................................. B02C 19/12
(52) U.S. Cl. ......................... 241/24.23; 241/5; 241/26; 241/27
(58) Field of Search ........................... 241/5, 24.23, 26, 241/27, 92, 244, 251, 261.2, 296

(56) References Cited

U.S. PATENT DOCUMENTS

| | | | | |
|---|---|---|---|---|
| 772,642 A | * | 10/1904 | Carr .......................... 241/261.2 |
| 1,745,727 A | * | 2/1930 | Sterzl .......................... 241/146 |
| 4,191,335 A | * | 3/1980 | Cavagna ....................... 241/17 |
| 4,964,576 A | * | 10/1990 | Datta ........................... 241/19 |
| 5,167,375 A | * | 12/1992 | Datta ....................... 241/46.02 |
| 5,244,159 A | * | 9/1993 | Newnan ................... 241/261.3 |
| 5,248,098 A | * | 9/1993 | Schade ......................... 241/23 |
| 5,338,337 A | * | 8/1994 | Johnson et al. ............... 75/654 |
| 5,384,989 A | * | 1/1995 | Shibano ........................ 451/36 |
| 5,482,216 A | * | 1/1996 | Hess ........................... 241/23 |
| 5,667,150 A | * | 9/1997 | Arasmith et al. .............. 241/18 |
| 5,730,376 A | * | 3/1998 | Schneid et al. .............. 241/245 |
| 6,076,752 A | * | 6/2000 | Paradowski et al. .......... 241/16 |

* cited by examiner

*Primary Examiner*—William Hong
(74) *Attorney, Agent, or Firm*—Blakely Sokoloff Taylor & Zafman LLP

(57) ABSTRACT

A method comprising grinding a contaminated material in a pulverizing mill to inactivate parasite or microorganisms is claimed. The contaminated material is exposed to an alternating mechanical energy field. Oscillating stress and pressure amplitudes is created in a macrosonic field of mechanical energy.

9 Claims, 5 Drawing Sheets

PHYSICAL INACTIVATION OF PARASITES

CROSS-REFERENCE TO RELATED APPLICATION

This application claims the benefit of the earlier filing date of provisional application of Bertwin Langenecker entitled, "Physical Inactivation of Parasites," Ser. No. 60/230,223, filed Aug. 31, 2000 and incorporated herein by reference.

BACKGROUND

1. Field of the Invention

The invention relates generally to a method and an apparatus for inactivating parasites or microorganisms in a medium such as soil, and more specifically to inactivate nematodes.

2. Background

Parasites such as plant-parasitic nematodes are recognized as one of the greatest threats to crops. Plant-parasitic nematodes cause approximately eighty billion dollars of crop loss in the world each year by reducing the quality and quantity of crop yield. Nematodes can attack almost every part of the plant including roots, stems, leaves, fruits and seeds. Nematodes are difficult to control because they are capable of living in almost any environment.

In order to control nematodes, it is a common practice to apply nematicides (i.e., pesticides used to destroy nematodes). However, such pesticides have an adverse effect on the human health and the environment. One problem associated with pesticides is that the pesticides can travel through the soil and enter the ground water. Typically, farmers who use the pesticides use the water as their sole source of drinking water. Since many pesticides are considered carcinogenic, the farmers and their families are placing their health at risk.

Moreover, many consumers are seeking organically grown (i.e., grown without pesticides) vegetables, fruits and grains. For these reasons, many farmers are trying to find other means in which to eliminate nematodes that do not affect human health and the environment. It is therefore desirable to have a method that destroys nematodes without the use of pesticides. Additionally, pesticides, for example methylbromide, while removing up to 100% of the active nematodes, typically do not remove 100% of the nematode eggs.

SUMMARY

A method is disclosed in which a contaminated material is ground in a pulverizing mill exposing the contaminated material to an alternating mechanical energy field to inactivate parasites or microorganisms. Moreover, an oscillating stress and pressure amplitudes is created in a macrosonic field of mechanical energy impact. Other features and advantages will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

One embodiment of the invention relates to inactivating and/or destroying parasites. Parasites, in this case, include plant-parasitic nematodes. Parasites may also include bacteria and viruses that may be present in soil or other material. This is accomplished by grinding a contaminated material in a pulverizing mill such as a grinding mill. The contaminated material is exposed to an alternating mechanical energy field. Oscillating stress and pressure amplitudes is created in a macrosonic field of mechanical energy. The parasites are inactivated by this process.

The following detailed description and the accompanying drawings are provided for the purpose of describing and illustrating presently preferred embodiments of the invention only, and are not intended to limit the scope of the invention in any way.

Figure 1:
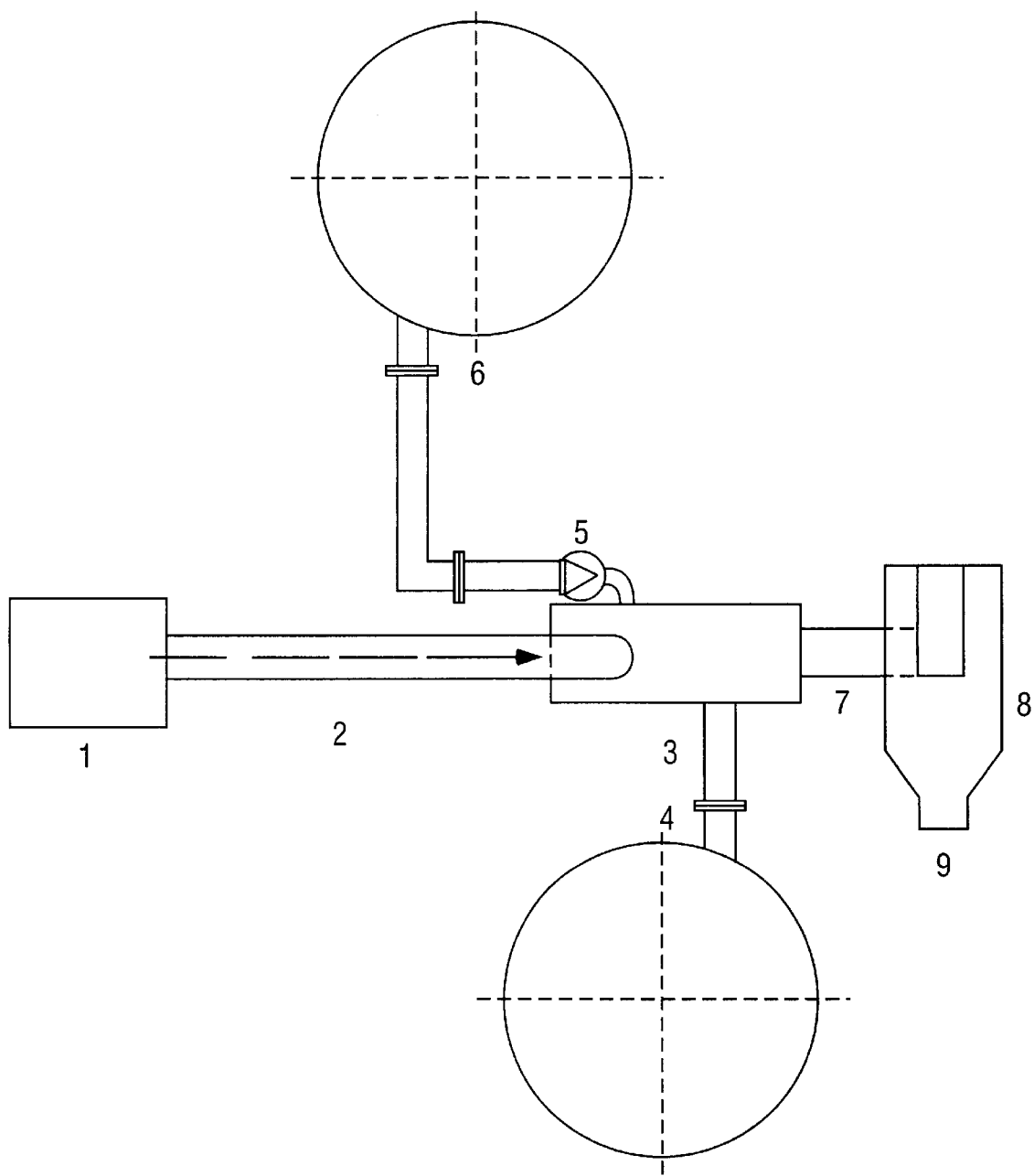
FIG. 1 is a schematic diagram of a treatment system for treating parasites in a material such as soil.

FIG. 1 illustrates a schematic of one embodiment of a process flow of treating soil. Contaminated material (e.g., soil infested with nematodes, other microorganisms, etc.) is typically dug up and prepared for treatment by placing the contaminated material in area 1. The contaminated material in area 1 may be sifted through to remove debris and large objects, such as rocks. The remaining material may be conveyed by, for example, belt or screw conveyor 2 into grinding machine 3. Grinding machine 3 includes a housing with an opening to receive contaminated material and an outlet for contaminated material that has been treated. Disposed within the housing is a rotating comminuting grinder. The grinder includes a stator stationary with respect to the housing. The stator is the member against which the contaminated material is compressed by the grinder to pulverize the material. A rotor is rotatably supported relative to the stator about a horizontal axis or a vertical axis and a horizontal drive shaft or preferably a vertical drive shaft connected to the rotor. One advantage of a vertical drive shaft over a horizontal drive shaft is that the contaminated material to be treated is fed through an inlet opening "at the top" into grinding machine 3 and can be removed "at the bottom" (i.e., straight path following gravity). This assures substantially better, trouble-free operation over horizontal shaft, for instance, where the material follows a zigzag path.

The contaminated material passes through the narrow gap between the rotor rotating at a high speed and its counterparts in the stator of grinding machine 3 of FIG. 1. This subjects the contaminated material in grinding machine 3 to strong alternating tensile, compressive, and friction forces. Specifically, the contaminated material is subjected to a high amplitude ultrasonic or "macrosonic" energy field of oscillating stress and pressures. The strongly agitated mechanical energy field can reach local pressure peaks of up to 10,000 atmospheres. The contaminated material is then pulverized or comminuted into small particles which produces heat (e.g., local "heat shocks") with temperatures $T \geq 100°$ C. Nematodes and other microorganisms cannot withstand these physical effects and are inactivated. In addition, nematode eggs are inactivated by these effects, and typically 100% of nematode eggs in a sample will be inactivated.

In one embodiment, the "tools" of the grinding machine such as a macrosonic grinding machine (MGM) are designed to create an energy field that oscillates at 5–20 kilocycles (kc) or kilohertz (kHz). This "macrosonic field" is effective in the gap between grinding machine's stator and rotor (i.e., where the material is ground). Typically, rotors rotate at 3,000–6,000 revolutions per minute (RPM) for a certain throughput. However, it will be appreciated that the rotors may rotate at a variety of RPM to inactivate parasites. At throughputs of up to about 15 tons/hour of contaminated material, universal mills (pulverizers) may be used and adapted for macrosonic grinding using any of suitable grinding tools of various types, such as vortex rotor, beater or pin disk, and the like, which can be adapted to the contaminated material (e.g., soil, etc.) to be treated. For large throughputs of contaminated material (e.g., soil, sludge, etc.), such as 100 tons/hour, rod or ball mills should be used, powered by motors having up to 900 kilowatts (kw).

As a precaution against accidental self ignition or dust explosion in grinding machine 3, the contaminated material may be pulverized either under an atmosphere (e.g., air) or in atmosphere of inert gas (e.g., nitrogen) stored in tank 4 and fed into grinding machine 3. It is preferable to use nitrogen. It will be appreciated that inert gas may also be used to control the temperature in grinding machine 3.

The temperature in grinding machine 3 may also be controlled by injecting a liquid such as water pumped by pump 5 from storage tank 6, into grinding machine 3. In another embodiment, the pH is of the liquid (e.g., water) is adjusted to be in a weak alkaline range, such as in a range of 8 to 11, by adding an acid or a base in order to promote the inactivation of plant-parasites.

Additionally, liquid such as water can be used as media for in situ cavitation that can be created in the gap between the stator and the rotor of grinding machine 3 by the macrosonic stress field. Cavitation enhances the process of inactivation of plant-parasitic nematodes.

In the next operation, the contaminated material that is now considered treated material is. collected and may be fed by means of conveyor 7 into cyclon 8. The treated material can be discharged through the outlet 9. When the processed product exits grinding machine 3, the processed product is dry, or, if liquids (e.g., water) were added, it may have a slushy consistency depending on the amount of water added.

Table 1 illustrate the benefits of one embodiment of a method of physical inactivation of parasites. Three samples of soil were assayed for active nematodes and their eggs. Sample N-0 was a non-treated sample to establish a base line, or calibration of the contamination of soil as received. Sample N-0 had a concentration of spiral nematodes of 190 nematodes per 100 cubic centimeters (cc) of soil, a root knot concentration of 60 nematodes per 100 cc and a concentration of nematode eggs of 30 eggs per 100 cc of soil.

Samples N-1 and N-2 of Table 1 were processed in a grinder having a gap between the grinder and the stator of about 65/1000 of an inch or 0.065 inch. Sample N-1 was treated dry and sample N-2 was treated wet. Both treated samples had zero measurable active nematodes and zero nematode eggs.

TABLE 1

| SAMPLE | NEMATODE | NO. NEMATODE/100 CC-SOIL |
|---|---|---|
| N-0 = Non-treated soil | Spiral (Helicotylenchus) | 190 |
|  | Root knot (Meloidogyne) | 60 |
|  | Nematode eggs | 30 |
| N-1 - Treated, Dry | No plant parasitic nematodes detected | 0 |
|  | No nematode eggs | 0 |
| N-2 - Treated, Wet | No plant parasitic nematodes detected | 0 |
|  | No nematode eggs | 0 |

In some instances, the soil, after treatment by grinding, may be ground too fine to adequately support crop growth. That is, the soil may be ground too fine and therefore is too closely packed to allow sufficient circulation of air and water. In these instances, an organic substance may be added to the treated soil. These organic substances permit, by their physical presence in the soil, enhanced circulation of water and air when the soil is too closely packed to permit circulation by itself. The organic substances also contribute a fertilizer effect by their decomposition in the soil. These organic substances may be, but are not limited to, harvest leftover and green waste.

Figure 2:
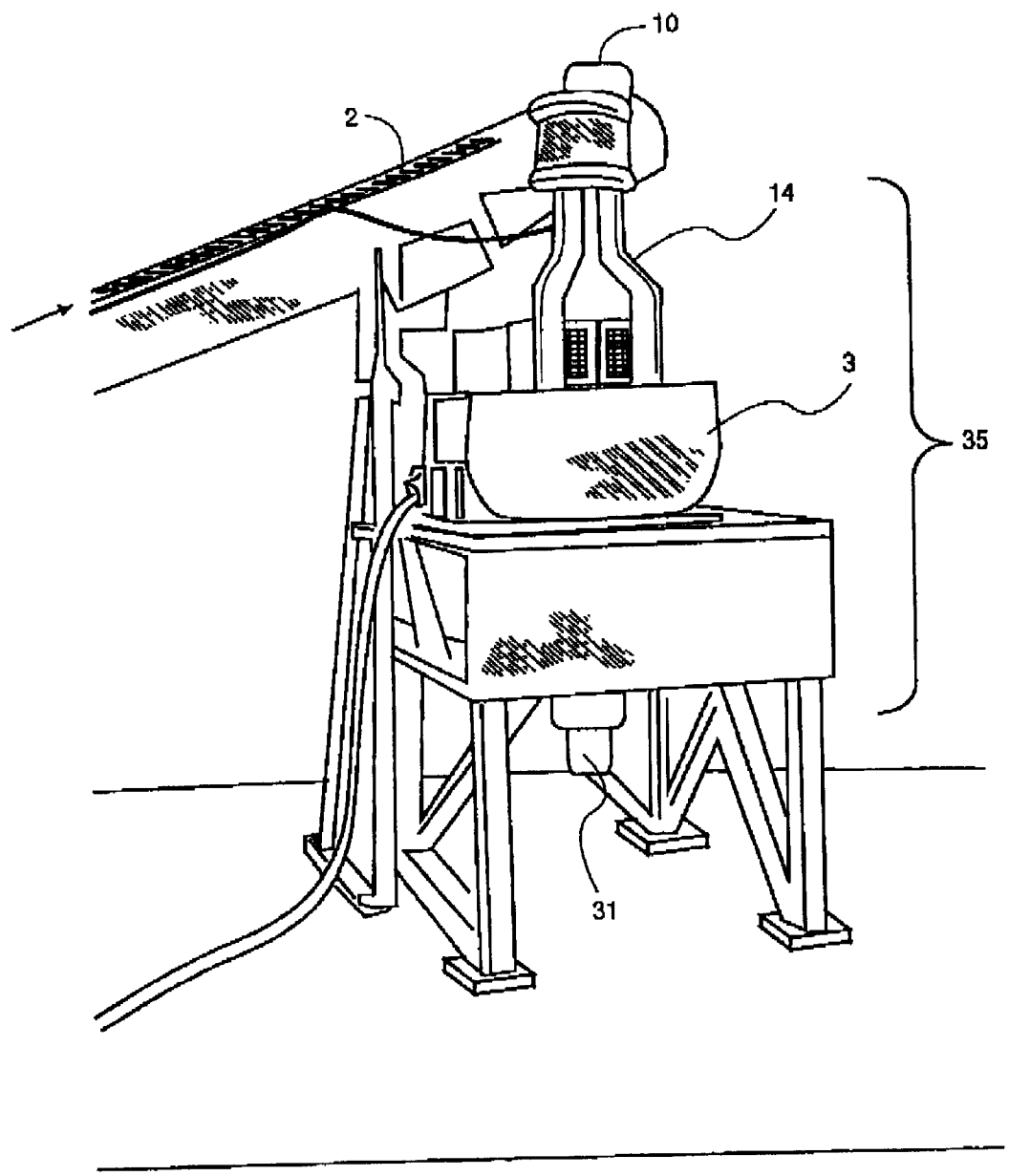
FIG. 2 is a perspective schematic view of one treatment system including a grinding machine for processing soil and other materials.
Figure 3:
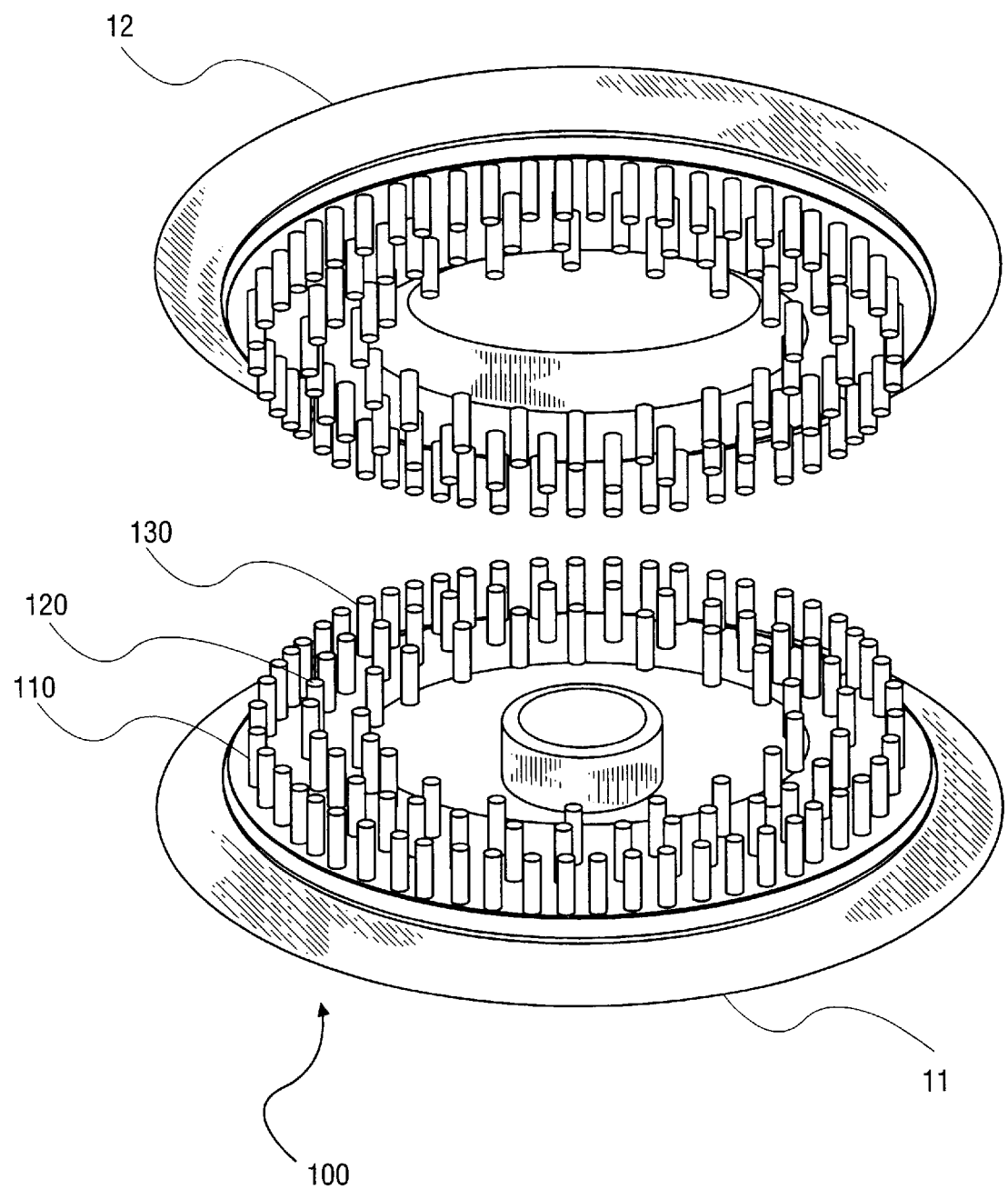
FIG. 3 is a perspective view of a pair of pin disks suitable for use in the grinding machine of FIG. 2 that may be used in one grinding machine in accordance with one embodiment of the invention.

FIG. 2 schematically illustrates a system including one suitable grinding machine having certain components which may be available from GMA Glasformen-Maschinen GMbH of Koflach, Austria. Grinding machine 35 is powered by a 37 KW electric motor and may have a throughput of about 5 (metric) tons/hour at 4,000 RPM. Grinding machine 3 includes, in one embodiment, pin disks (11 and 12 illustrated in FIG. 3). Referring to FIG. 3, it will be appreciated that the pin disks (11, 12) may be designed in a variety of ways. Pin disk 11 may rotate while pin disk 12 does not rotate. Alternatively, pin disk 12 may rotate while pin disk 11 does not rotate. Additionally, pin disk 11 and pin disk 12 may rotate together. The pins in pin disk 12 are placed in pin disk 12 such that the pins in pin disk 11 do not contact pins in pin disk 12.

Referring to FIG. 3, pins 100 are designed to be easily exchangeable when needed (e.g., for sharpening, hardening treatment, and the like). It will be appreciated by one skilled in the art that the design and placement of pins 100 may be configured in numerous ways in order to inactivate parasites. An example of one such configuration is provided below. Pins 100 are located circumferentially around pin disk 11 and pin disk 12. A pin may have an active length of about 1.5 centimeters (cm) to about 1.6 cm. The diameter of a pin may be about 0.749 inches. In one embodiment, a first set of pins 110 are located nearest to the outer diameter of pin disk 11 and pin disk 12. A second set of pins 120 are located near the first set of pins 110. The second set of pins 120 are located on the side of first set of pins 110 closer to the inner diameter of pin disk 11 and pin disk 12. A third set of pins 130 are located near second set of pins 120. Third set of pins 130 are on the side of second set of pins 120 closer to the inner diameter of pin disk 11 and pin disk 12.

Figure 2A:
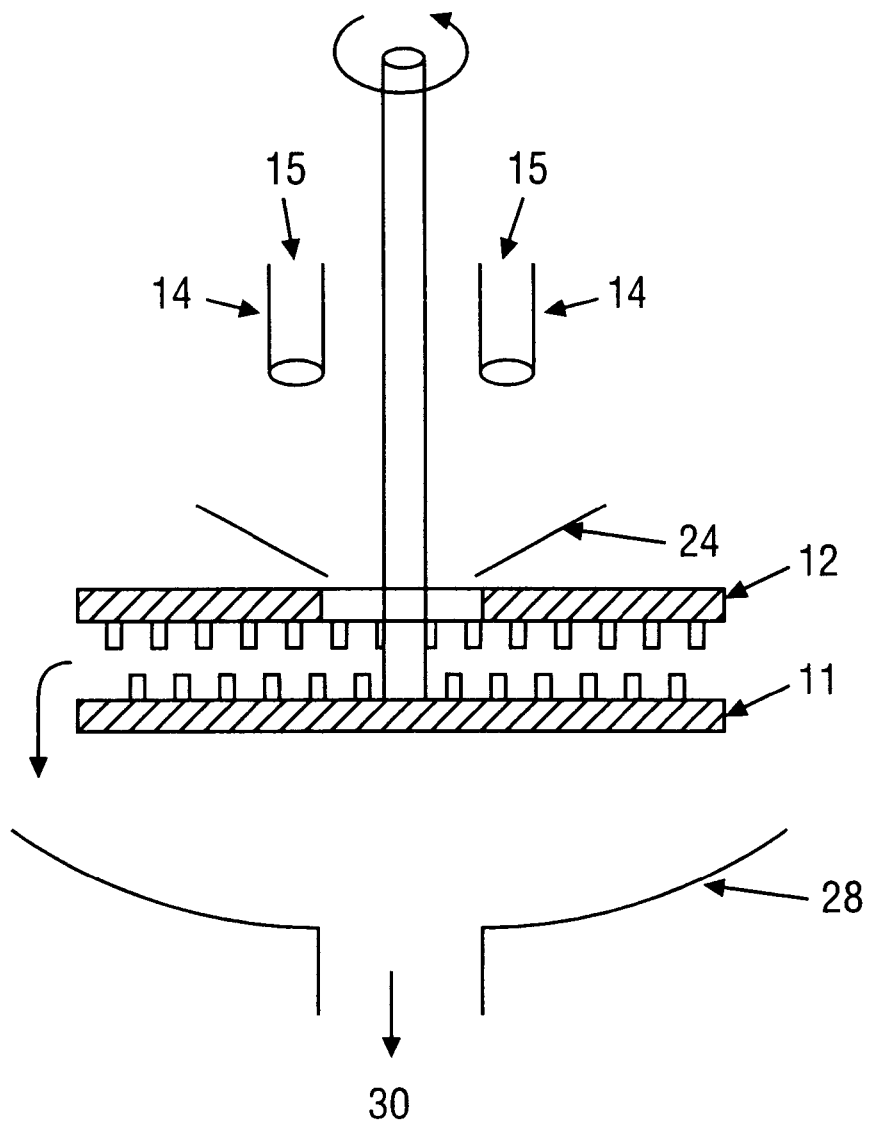
FIG. 2A is a schematic cross-sectional side view through the grinding machine of FIG. 2.

FIG. 2A is a cross-sectional cutaway schematic view of the interior of the vertical grinder of FIG. 2. Referring to FIG. 2 and FIG. 2A, contaminated material 15 from conveyor belt 2 leaves initial collecting hopper 410 in vertical material tubes 14. The material 15 leaves tubes 14 and is spread uniformly to drop onto pin disk 11 by uniform distribution hopper 24. Contaminated material 15 passes through a center hole in pin disk 12, and lands on spinning pin disk 11. The centrifugal force imported to material 15 by pin disk 11, which may be rotating up to 4000 RPM, impels material 15 radially through alternately spinning and stationary pins of pin disks 11 and 12. When material 15 has been treated by the grinders, it falls over the edge of pin disk 11 onto final collecting hopper 28 and may leave as treated material through exit 30.

Regarding the pin disks shown in FIG. 3, the first set of pins 110 has pins that are substantially equidistant apart. The distance from one pin to another pin in the first set of pins 110 may be about 3 cm. Additionally, the distance between a pin in the first set of pins and a second set of pins 120 is about 2.9 cm. Second set of pins 120 have pins that are substantially equidistant apart. The distance between one pin to another pin in the second set of pins is about 1.6cm. Third set of pins 130 also have pins that are substantially equidistant apart. The distance between one pin and another pin in the third set of pins 130 is about 1.4 cm.

Figure 4:
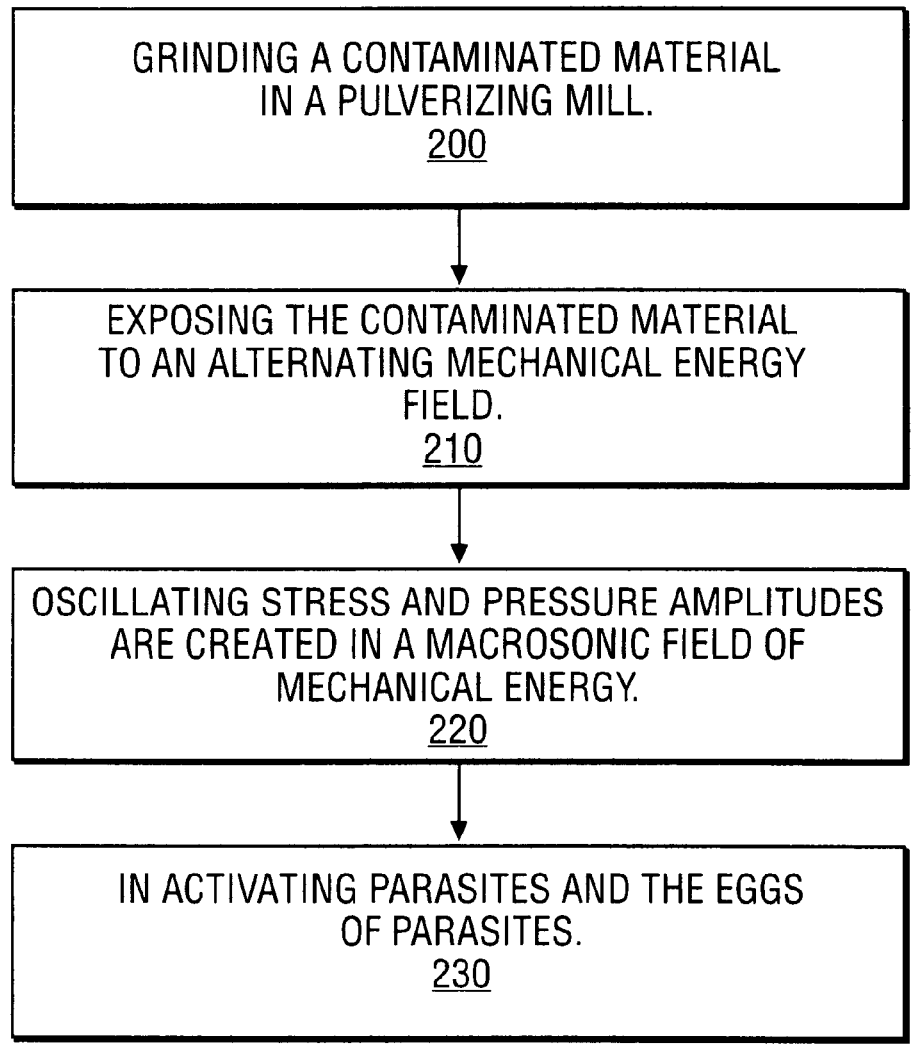
FIG. 4 is a flow diagram of a treatment method for treating soil.

FIG. 4 illustrates a flow diagram of the treatment method in accordance with one embodiment. At block 200, contaminated material is ground in a pulverizing mill such as a grinding machine. At block 210, the contaminated material is exposed to an alternating mechanical energy field. At block 220, oscillating stress and pressure amplitudes are created in a macrosonic field of mechanical energy. At block 230, parasites and the eggs of parasites die or are inactivated.

In the foregoing specification, the invention is described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   grinding a contaminated material in a pulverizing mill;
   exposing the contaminated material to an alternating mechanical energy field;
   creating oscillating stress and pressure amplitudes in a macrosonic field of mechanical energy; and
   inactivating one of nematodes, other microorganisms, nematode eggs, and eggs from other microorganisms.

2. The method of claim 1, wherein creating the oscillating stress and pressure amplitudes in the macrosonic field of mechanical energy occurs at frequencies of greater than about 5 kc.

3. The method of claim 1, wherein the contaminated material is infested with one of nematodes and other microorganisms.

4. The method of claim 1, further comprising: adding liquid during grinding.

5. The method of claim 4, wherein the contaminated material is ground while the contaminated material is wet enabling cavitation to be created by the macrosonic field.

6. The method of claim 1, further comprising:
   placing inert gas into a chamber before grinding the contaminated material.

7. The method of claim 1, further comprising:
   placing inert gas into a chamber while grinding the contaminated material.

8. The method of claim 7, wherein the contaminated material is ground in an inert atmosphere to prevent dust explosions.

9. The method of claim 1, further comprising:
   promoting inactivation by adjusting a pH value in a range of 8 to 10.

\* \* \* \* \*